(No Model.)

J. E. HAND.
ALIDADE.

No. 293,013. Patented Feb. 5, 1884.

WITNESSES:
A. P. Grant
W. F. Kircher

INVENTOR:
John E. Hand,
BY John A. Wiedersheim
ATTORNEY.

UNITED STATES PATENT OFFICE.

JOHN E. HAND, OF PHILADELPHIA, PENNSYLVANIA.

ALIDADE.

SPECIFICATION forming part of Letters Patent No. 293,013, dated February 5, 1884.

Application filed January 19, 1883. (No model.)

*To all whom it may concern:*

Be it known that I, JOHN E. HAND, a subject of Great Britain, residing in the city and county of Philadelphia, State of Pennsylvania, have invented a new and useful Improvement in Alidades, which improvement is fully set forth in the following specification and accompanying drawings, in which—

Figure 1:
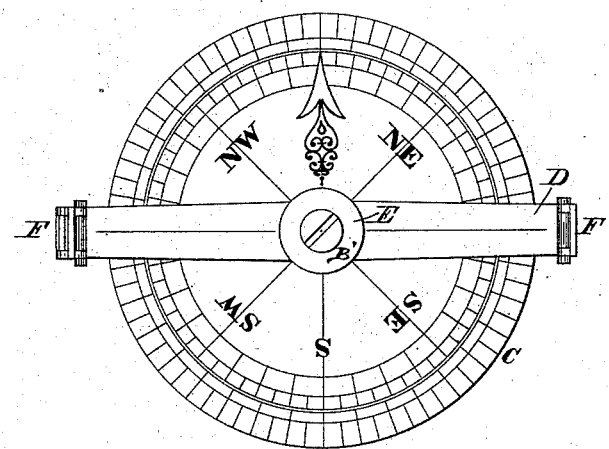
Figure 2:
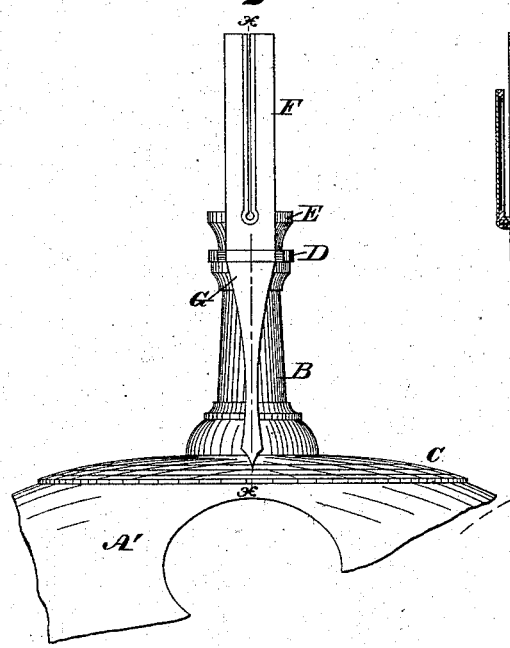
Figure 3:
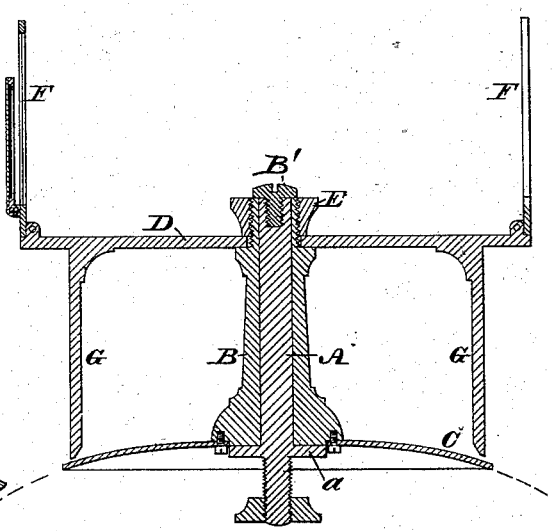

Figure 1 is a top or plan view of an alidade embodying my invention. Fig. 2 is a side elevation thereof. Fig. 3 is a vertical section thereof in line $x$ $x$, Fig. 2.

Similar letters of reference indicate corresponding parts in the several figures.

My invention consists of an alidade connectible with a binnacle adapted for taking bearings in short space of time, constructed simple and inexpensive, and possessing other advantages, as will be hereinafter fully set forth.

Referring to the drawings, A represents the central post of the alidade, which is securely connected with the binnacle A'.

B represents a sleeve or hollow pillar, which is fitted on the post A and rests on a collar or shoulder, $a$, on the lower portion of said post. The post A passes through the sleeve B to the top thereof and receives a screw, B', the head whereof overlaps the inner periphery of the sleeve, thus primarily connecting said sleeve and post.

To the bottom of the pillar B is secured the graduated plate C of usual form.

D represents an arm, which is fitted freely on the upper end of the pillar B and clamped thereto by a nut, E, screwed to the top of the pillar, it being seen that when said nut is tightened the arm D, pillar B, and graduated plate C rotate as one on the central post, and when said nut is loosened the arm D may be rotated independently of the pillar and graduated plate.

Attached to the opposite ends of the arm D are the sights F, and depending from said ends are fingers G G, which sweep over the graduations of the plate C.

The operation is as follows: Suppose the sun's true bearing is N. 110 E., first loosen the nut E and turn the arm D until one of the fingers stands over N 110 E of the plate C. Then tighten the nut and turn the instrument until the sun casts a shadow on the arm D, when the difference between the alidade-plate and the compass is the deviation.

As the sleeve B and post A are securely clamped together by the screw B' independent of the nut E, it will be seen that as the sleeve, post, and graduated plate are connected as one when said nut is loosened, the arm D may be rotated without rotating the sleeve B and disturbing the graduated plate C, and the nut be screwed and unscrewed without affecting the head of the screw B', said head being freely encircled by the nut.

Having thus described my invention, what I claim as new, and desire to secure by Letters Patent, is—

1. A central post, a sleeve fitted thereon, a graduated plate rigidly connected with said sleeve, and a sight-carrying arm fitted on said sleeve, in combination with a screw and nut, said screw being adapted to connect said post and sleeve, and said nut to clamp said sleeve and arm, substantially as and for the purpose set forth.

2. A central post, a sleeve, a graduated plate, a sight-carrying arm, a securing-nut for said post and sleeve, and a clamping-nut for said sleeve and arm, in combination with a binnacle, substantially as and for the purpose set forth.

JOHN E. HAND.

Witnesses:
W. F. KIRCHER,
H. E. GARSED.